June 13, 1939.  J. P. LAWRENCE  2,162,688
CONVEYER SYSTEM DRIVE
Filed Dec. 31, 1937  2 Sheets-Sheet 1
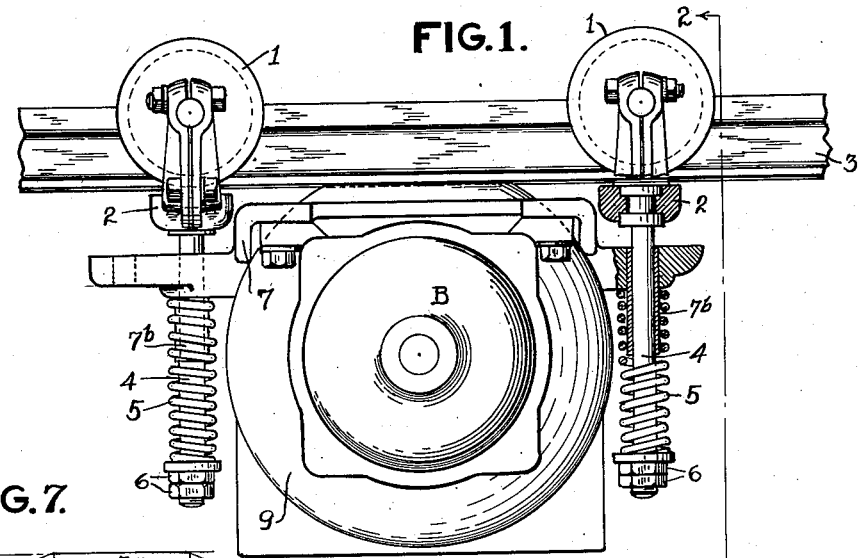
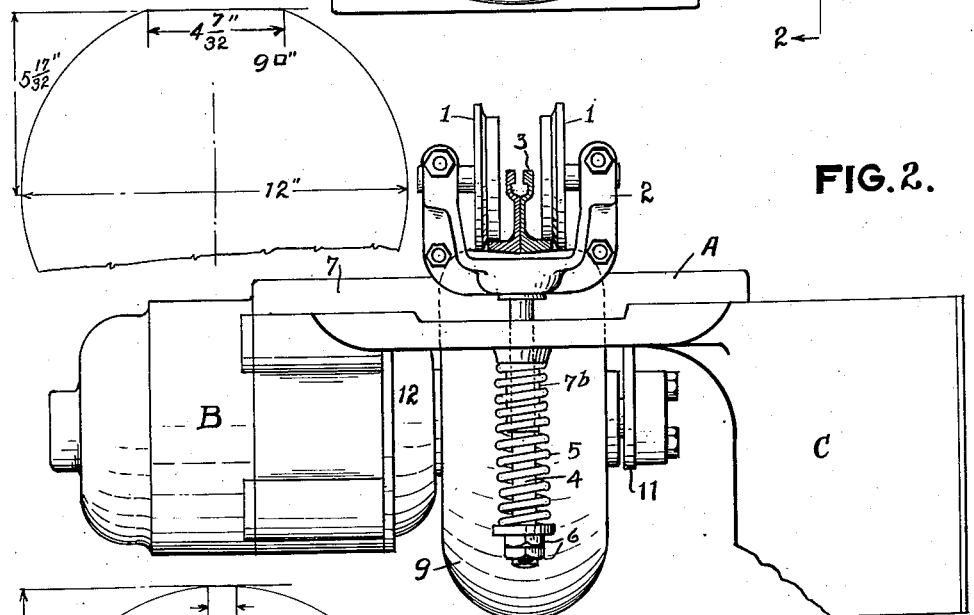
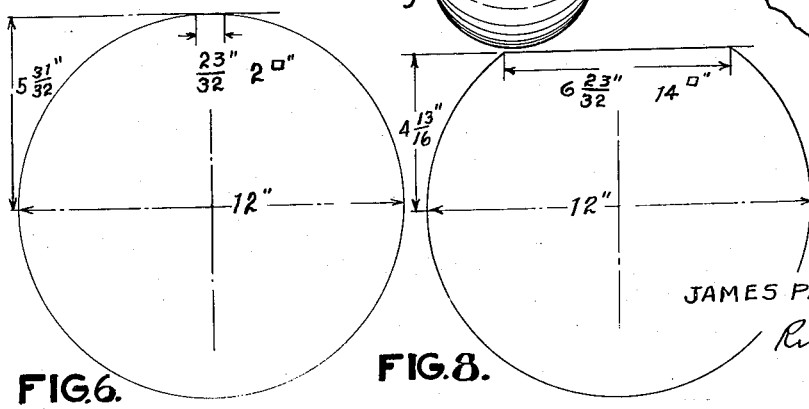
INVENTOR.
JAMES PAUL LAWRENCE.
ATTORNEYS.

June 13, 1939.　　　J. P. LAWRENCE　　　2,162,688
CONVEYER SYSTEM DRIVE
Filed Dec. 31, 1937　　　2 Sheets-Sheet 2

INVENTOR.
JAMES PAUL LAWRENCE
BY Richey Watts
ATTORNEYS.

Patented June 13, 1939

2,162,688

UNITED STATES PATENT OFFICE 2,162,688

CONVEYER SYSTEM DRIVE

James Paul Lawrence, Cleveland, Ohio, assignor to The American MonoRail Company, Cleveland, Ohio, a corporation of Ohio Application December 31, 1937, Serial No. 182,771

10 Claims. (Cl. 105—153)

This invention relates to drives for conveyer systems, including tractors and cranes and more particularly to a drive which is capable of maintaining substantially constant draw bar pull on various track conditions.

The principle object of the present invention is to provide a drive for conveyer systems which is of simple mechanical construction and which is capable of developing a large amount of draw bar pull, and of maintaining the pull substantially constant thruout a wide range in track conditions and in air pressures in a driving wheel tire.

In the drawings accompanying and forming a part of this specification,

Figure 1 is a side view of one form of a device embodying the present invention;

Fig. 2 is a view of the device of Fig. 1 taken on lines 2—2 of Fig. 1;

Figure 3:
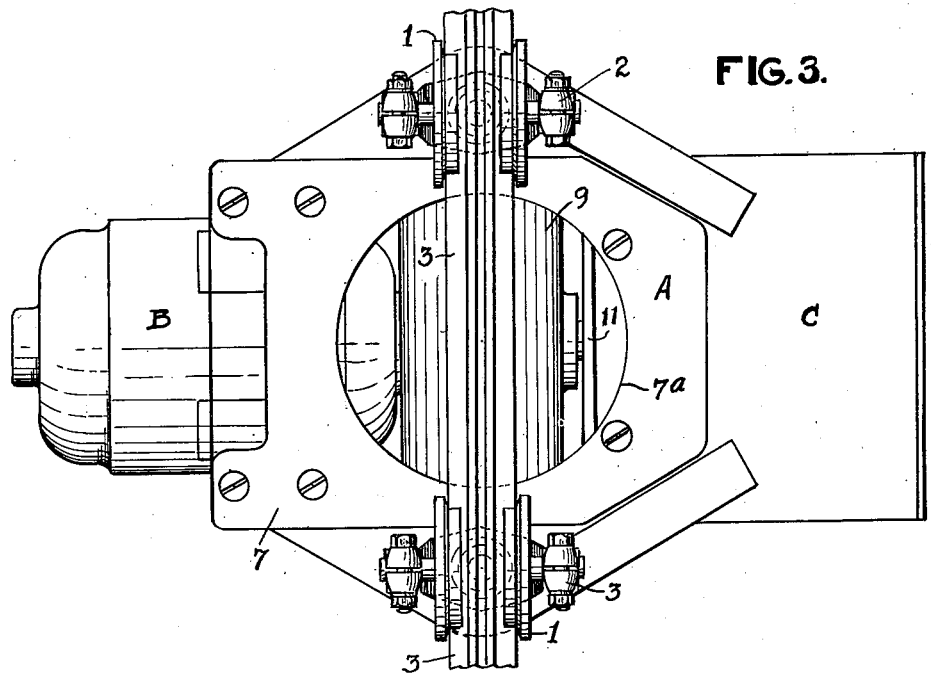
Fig. 3 is a top plan view of the device shown in Figs. 1 and 2.
Figure 4:
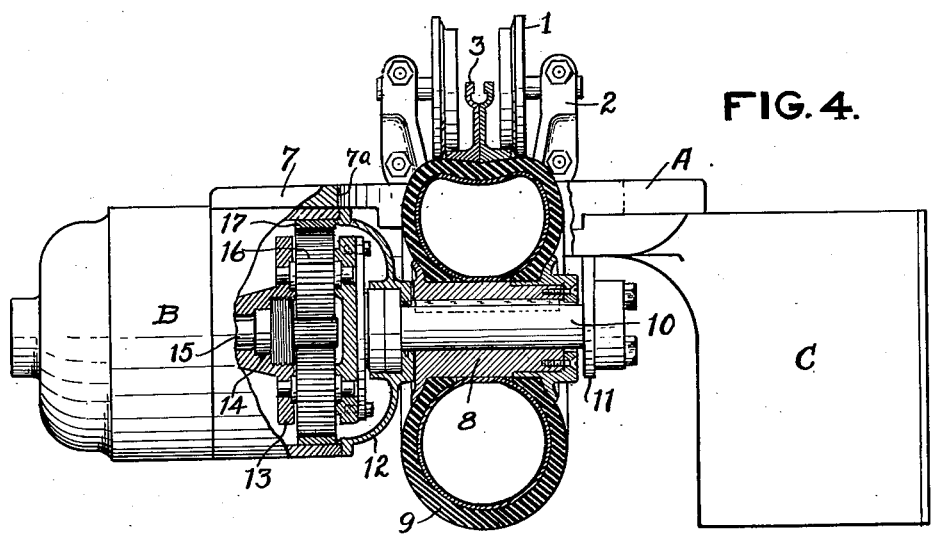
Fig. 4 is a view similar to Fig. 2 but partly in vertical central section showing details of the gear head motor and associated parts.

Figs. 1 to 4 show one form of drive embodying the present invention. The supporting trolley wheels 1, mounted in pairs in yokes 2, run on flanges of the rail 3 and support the entire drive unit. From each yoke 2, a rod 4 extends downwardly and is encircled by a compressed spring 5 which is seated at its lower end on adjusting means including nuts 6. A plate-like frame 7 is disposed horizontally beneath the track 3 and between yokes 2. This frame projects laterally on either side of a central vertical plane extending lengthwise of the track and thru rods 4. The frame 7 has a central opening 7a, the purpose of which will presently appear, and at either end has openings provided with elongated sleeves 7b in which rods 4 have a sliding fit and by which frame 7 is guided on said rods in movements toward and away from the rail 3. The upper ends of coil springs 5 surround the sleeves 7b and press against the under side of frame 7. The connection of rods 4 to yokes 2 permits turning movement of these members relative to one another and the rods 4 and sleeves 7b are capable of turning movement relative to each other. The wheels 1 are thus free to follow lateral curvatures in track 3 without exerting bending or twisting stresses on frame 7, and setting up material amounts of friction.

A drive wheel positioned in the aforesaid vertical plane consists, preferably, of a hub 8 and an enlarged pneumatic tire 9 which projects thru the opening 7a of frame 7 and engages with the under surface of the rail 3 for the full width thereof and lengthwise of the rail for a distance dependent upon the air pressure in the tire and pressure of the springs 5. The pressure exerted on the rail by the pneumatic tire is substantially uniform thruout the entire area of contact. It will be understood that a hub or wheel larger than hub 8, and a tire smaller than tire 9, may be used in lieu of the parts 8 and 9 shown on the present drawings, but that I prefer the illustrated construction. It will further be understood that I may also use a hub or wheel with a tread or tire which is composed of suitable material, such, for example, as rubber having spaces therein to accommodate flow of the rubber under compression, which will deform under the pressure of springs 5 and exert a pressure on the rail which is substantially uniform thruout the entire area of contact. It will be noted that the under surface of the rail 3 is not a plane surface but slopes upwardly and outwardly slightly in opposite directions from the central plane of the rail and that considerable deformity of a tire is essential to attain substantially uniform pressure thruout all parts of the area of contact between the tire and rail.

The motor B is disposed entirely on one side of the aforesaid central vertical plane and connected to frame 7. Motor B is mounted with its axis in alignment with shaft 10 to which the hub 8 of the wheel is keyed. Shaft 10 is supported at one end in a bracket 11 depending from frame 7 and at the other end in bearings in the housing 12 of motor B. The shaft 10 is connected to a rotating gear cage 13 housed in motor B, which cage has an additional bearing 14 on the rotor shaft 15 of the motor and carries three planet gears 16 which mesh with a gear on the end of rotor shaft 15 of motor B and also mesh with the ring gear 17 carried by the motor housing. When rotor shaft 15 is rotated the gear thereon turns planet gears 16 and they in turn rotate cage 13 and shaft 10, which is connected therewith, thereby driving the drive wheel along the under surface of the rail 3. Rotor shaft 15 and wheel shaft 10 are located in axial alignment.

Controls for motor B and additional counterweights, if any are required, are housed in box C which is secured to frame 7 and disposed entirely on the side of the aforesaid central vertical plane opposite to the motor B. This opposed mounting of motor B and controls and counter-balances C serve to balance the entire unit on opposite sides of the vertical plane and thus distribute the weight thereof substantially equally on the opposed sets of trolley wheels 1.

It will be understood that when the tire 9 engages with the rail it is flattened on the top so that it has several square inches of total area pressed with substantially uniform pressure against the rail. Since the frame 7 may move parallelly toward and away from the rail along guide rods 4 in response to the air pressure in the tire and the pressure of springs 5, this frame and the axis of the drive wheel may be considered as possessing the property of floating fully or freely relative to the rail in response to variations in track conditions such as vertical bends or track non-uniformity, and air pressure in the tire and the pressure of springs 5.

Figure 5:
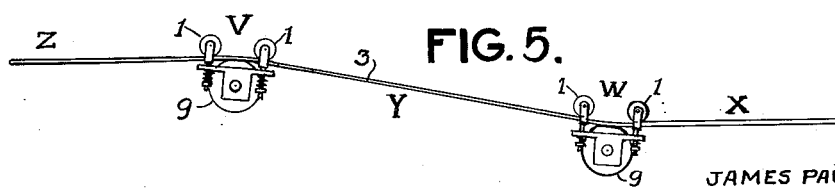
Fig. 5 illustrates diagrammatically different track conditions which can be accommodated by the present invention; and, Figs. 6, 7 and 8 are diagrammatic views indicating a range in length and area of contact of the pneumatic tire with a rail obtainable with different air and/or spring pressures.

The floating action of the wheel axis and frame under certain conditions is illustrated diagrammatically in Fig. 5, wherein the rail has two vertical bends V and W and an inclined section Y between two horizontal sections of rail X and Z. The axis of the drive wheel floats relative to the trolley wheels and is maintained at a constant distance from the under surface of the rail when the air and spring pressures are constant. When the drive A moves from right to left from the lower horizontal section X of the rail around the curve W, the trolley wheels 1 run on the inside of the curve with the drive wheel on the outer side. The springs 5 permit the frame 7 and the axis of the drive wheel to move away from the trolley wheels and the axis to be maintained a constant distance away from the rail. As both sets of trolley wheels pass beyond the curve and onto the inclined rail section Y, the frame and wheel axis shift toward the trolley wheels into their normal position, with maintenance of the same distance between the wheel axis and rail. As the trolley wheels run around the bend V at the upper end of rail section Y, the springs 5 move the axis of the wheel toward the trolley wheels, from which position the axis is returned to normal position when the trolley wheels both are on rail section Z.

Fig. 5 illustrates an important advantage of devices embodying the present invention, namely, the automatic maintenance of a substantially uniform draw bar pull on inside and outside rail curves, as well as on straight rail. This advantage is of great importance for several reasons.

It will be understood that the maximum draw bar pull required in any given installation, such for example as is illustrated by Figure 5, will be on the inclined rail section Y and at the upper curve V. Any pressure of the drive wheel on the rail which is sufficient to develop the draw bar pull required to move a given load along these sections of the rail will be more than is required to move the load along horizontal sections X and Z, because part of the weight of the load is being lifted when it is moved on inclined section Y and none of it is being lifted when being moved along a horizontal section X or Z. Due to the fact that the axis of the drive wheel can float freely toward and away from wheels 1 in response to the rail 3 and springs 5, the pressure to which the tire is subjected remains substantially constant even when the drive is moving around an outside curve, such as W. If the axis of the drive wheel were fixed relative to the axes of the supporting wheels 1, the air pressure in the tire would have to be sufficiently high to develop the requisite draw bar pull when the device was going along the inside curve V, where the rail is farthest away from the axis of the wheels 1. The tire would be deformed to a greater extent and would be subjected to more stress when it engaged rail sections such as X, Y and Z, because there the rail would be closer to the axis of the wheel than on inside curve V. This pressure on the tire and the resulting deformation and stress thereof would be still further increased when the wheel was going around an outside curve such as W, where the rail would be even closer to the axis of the wheel. By the present invention, however, wherein the wheel axis floats relative to the axes of the supporting wheels 1, under the influences of varying track conditions, air pressure in the tire and force exerted by springs 5, the pressure of the tire against the rail is substantially constant and uniform at all times, even with varying amounts of air pressure in the tire, and the pressure required at some particular part of the rail is no greater than that required at any other part, except insofar as it may be necessary to lift a part of the load. Consequently, the requisite draw bar pull is developed by devices of this invention at lower pressures and is maintained substantially constant thruout a wide range of variations in track conditions and air pressure in the tire and but little attention to the air pressure in the tire is required.

Figs. 5, 6 and 7 illustrate diagrammatically lengths and areas of contact which may be obtained with a device embodying the present invention, the diameter of the tire taken being about 12", and the pressure of springs 5 being the same in each of the figures.

In Fig. 6, with a high air pressure in the tire, the length of contact of the tire with the rail is about $\frac{23}{32}$" and the area of contact is about two square inches, with the axis of the wheel being about $5\frac{31}{32}$" away from the rail. With a lower air pressure, the length of contact is about $4\frac{7}{32}$" and the area of contact is about nine square inches, with the axis of the wheel being about $5\frac{17}{32}$" away from the rail, as shown in Fig. 7. With still lower air pressure, the length of contact is about $6\frac{23}{32}$" and the area of contact is about fourteen square inches, with the axis of the wheel being about $4\frac{13}{16}$" away from the rail, as is indicated in Figure 8.

Figs. 6, 7 and 8 illustrate the maintenance of a substantially constant pressure of the wheel against the rail and a substantially uniform draw bar pull, altho the air pressures in the tire vary widely and the distance of the axis of the wheel from the rail varies thruout a considerable range. Thus, widely different air pressures may be used without such a decrease in pressure of the tire against the rail as to permit slippage of the tire relative to the rail with resultant overheating and devulcanization of the tire.

If it be assumed that the air pressure in the tire of Fig. 6 is 100 lbs. per sq. in., the draw bar pull developed thereby will approximate 160 lbs., this pull being determined by multiplying the area of contact, that is 2 sq. in. by the pressure per sq. in. that is 100 lbs. and by the coefficient of friction of rubber on steel, that is .8. The same draw bar pull is attained under the conditions of Fig. 8 with an air pressure in the tire of about 14.3 lbs. per square inch.

Since the pressure of springs 5 may be varied by adjusting the nuts 6, the draw bar pull may be varied by varying the spring pressure. By suitably varying the factors of air and spring pressure, and the distance of the axis of the wheel from the rail and using various combinations of these factors, various loads may be handled over various rail conditions in the most practical manner.

Having thus described my invention so that others skilled in the art may be able to understand and practice the same, I state that what I desire to secure by Letters Patent is defined in what is claimed.

What is claimed is:

1. A tractor, for a conveyer system including a rail, comprising supporting wheels to run on the rail, a drive wheel having a pneumatic tire of greater width than said rail and engageable with the under surface of said rail for the full width of said surface and for a substantial distance lengthwise thereof, resilient means, including air under pressure in the tire and compression springs between the supporting wheels and the drive wheel, for shifting the axis of the drive wheel toward and away from the supporting wheels to maintain a substantially constant tractive effort of the tire on the rail under varying track conditions, and means to drive said drive wheel.

2. A tractor, for a conveyer system including a rail, comprising supporting wheels to run on the rail, a drive wheel having a readily deformable tire engageable with the under surface of said rail with substantially uniform pressure over an area whose length and breadth are approximately equal to the width of said rail surface, resilient means, including air under pressure in the tire and compression springs between the supporting wheels and the drive wheel, for shifting the axis of the drive wheel toward and away from the supporting wheels to maintain a substantially constant tractive effort of the tire on the rail, and means to drive said drive wheel.

3. A tractor, for a conveyer system including a rail, comprising supporting wheels to run on the rail, a drive wheel having a pneumatic tire of greater width than said rail and engageable with the under surface of said rail, means to drive said drive wheel, and resilient means, including air under pressure in the tire and compression springs between the supporting wheels and the drive wheel, to shift the axis of the drive wheel toward and away from the supporting wheels and to maintain the tire in contact with the under surface of the rail over an area which is as wide as said surface and increases in length as the air pressure in the tire decreases.

4. A tractor, for an overhead conveyer system including a rail, comprising wheels to run on said rail, a plate-like frame floatingly disposed beneath the rail and having a central opening, a drive wheel having an axis floating with said frame and having a pneumatic tire projecting thru said frame opening and engageable with the under surface of said rail, means to drive said drive wheel, and resilient means for automatically maintaining a substantially constant tractive effort of the tire on the rail, said means comprising air under pressure in the tire and springs carried by the tractor and cooperating with said frame for urging the tire against the rail.

5. A tractor, for a conveyer system including a rail, comprising a trolley having pairs of supporting wheels to run on flanges of said rail, rods depending therefrom, a frame beneath said rail and having elongated guides thru which said rods extend for sliding and rotative movement but non-tilting movement, a pneumatic tired drive wheel carried by said frame, means to drive said wheel, and resilient means carried by the rods and cooperating with the frame for urging said frame toward said rail parallelly along said rods and serving to vary the area of contact of the tire and rail in accordance with the air pressure in said tire.

6. A tractor, for an overhead conveyer system including a rail, comprising spaced trolleys having wheels to run on said rail and rods depending therefrom, a plate-like frame disposed beneath the rail and mounted on and slidable lengthwise of said rods, yieldable means supported by the trolleys and disposed between the same and the frame and serving to urge said frame along said rods toward said rail, said frame having a central opening, a pneumatic tired drive wheel carried by said frame and having a diameter closely approximating the distance between said rods, said tire projecting thru said frame opening and engaging with the under surface of said rail for the full width of said surface and for a length thereof which varies inversely with the air pressure in said tire, and means to drive said wheel.

7. A tractor, for a conveyer system including a rail, comprising a trolley having supporting wheels to run on said rail, a plate-like frame having a central opening beneath the rail and portions extending laterally beyond each side of the rail, spring means cooperating with the trolley of the frame for urging said frame bodily toward said supporting wheels, a drive wheel carried by said frame and having a deformable rubber tire projecting thru said opening and engageable with said rail, a motor to drive said wheel carried by one projecting portion of said frame, and motor controlling and counterbalancing means carried by said other projecting portion of said frame.

8. A tractor, for a conveyer system including a rail, comprising yokes having wheels to run on flanges of said rail, a laterally projecting frame having a central opening positioned beneath said rail, rods depending from said yokes and extending thru and supporting said frame for sliding movement lengthwise thereof, springs encircling said rods and pressing upwardly against said frame, a traction wheel carried by said frame between said rods and having a pneumatic tire projecting thru said frame opening and engaging with the lower surface of said rail, a motor carried by a laterally projecting part of said frame and axially aligned with and connected to said wheel, and means including motor controls carried by the opposite laterally projecting portion of said frame for counterbalancing said motor.

9. A tractor, for a conveyer system including a rail, comprising trolleys spaced apart along said rail, a plate-like frame having a central opening beneath said rail and portions projecting laterally on opposite sides thereof, rods depending from said trolleys and extending slidably thru said frame, a drive wheel supported by said frame positioned vertically below said rail and between said rods and having a pneumatic tire projecting thru said frame opening to engage the undersurface of the rail over its full width, a motor to drive said wheel carried by said frame at one side of said wheel and connected thereto, means to counterbalance said motor carried by said frame at the other side of said wheel, and means for maintaining a substantially constant tractive effort of the tire on said rail including air pressure in the tire and springs encircling said rods and pressing the frame upwardly lengthwise of said rods.

10. A tractor, for an overhead conveyer system including a rail, comprising wheels to run on said rail, a plate-like frame floatingly disposed beneath the rail supported by said wheels from the flanges of said rail and having a central opening, a drive wheel having an axis floating with said frame and having a pneumatic tire projecting through said frame opening and engageable with the undersurface of said rail, a motor and housing carried by said frame and having a rotor shaft, reduction gearing associated therewith, a shaft driven by said gearing and projecting from said motor housing, the said drive wheel being mounted on said projecting shaft, and resilient means for automatically maintaining a substantially constant tractive effort of the tire on the rail, said means comprising air under pressure in the tire and springs carried by the tractor and cooperating with said frame for urging the tire against the rail.

JAMES PAUL LAWRENCE.